UNITED STATES PATENT OFFICE.

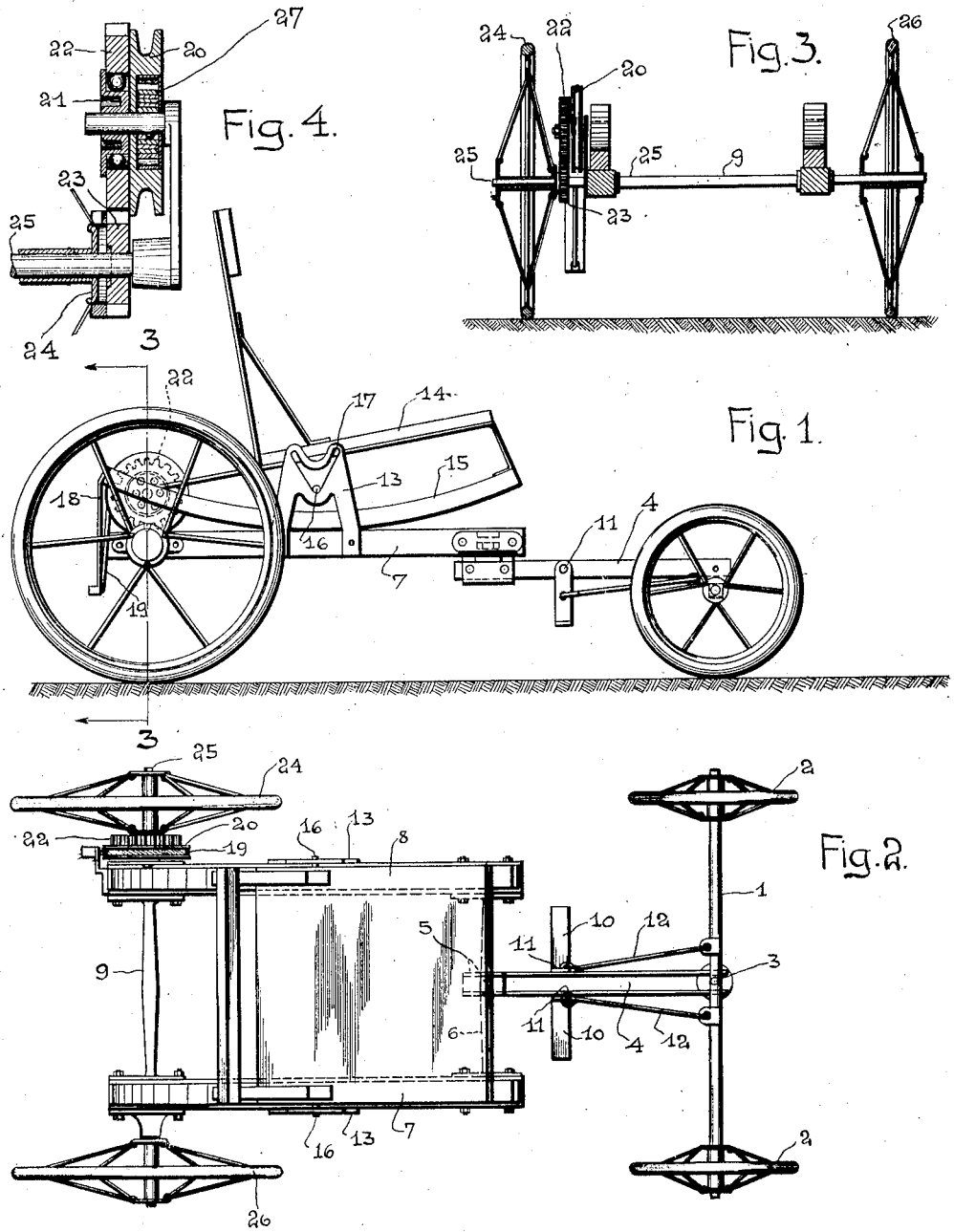

JOSEPH HINTZ, OF CHICAGO, ILLINOIS.

CART.

1,339,624.  Specification of Letters Patent.  Patented May 11, 1920.

Application filed August 9, 1919. Serial No. 316,335.

*To all whom it may concern:*

Be it known that I, Joseph Hintz, a citizen of the United States, and a resident of the city of Chicago, in the county of Cook and State of Illinois, have invented a new and useful Improvement in Carts, of which the following is a full, clear, and exact description.

My invention relates to improvements in carts, and it consists in the combinations, constructions and arrangements herewith described and claimed.

An object of my invention is to provide a small cart or wagon which has a rocking chair, and which may be propelled by the occupant of the chair in rocking back and forth.

A further object of my invention is to provide a novel form of cart or car which is simple in construction, and relatively cheap to manufacture.

Other objects and advantages will appear in the following specification, and the novel features of the invention will be particularly pointed out in the appended claims.

My invention is illustrated in the accompanying drawings, forming a part of this application, in which—

Figure 1 is a side view of the device,

Fig. 2 is a plan view,

Fig. 3 is a section along the line 3—3 of Fig. 1,

Fig. 4 is a section through the clutch.

In carrying out my invention, I provide a front axle 1, to which are secured wheels 2 of any suitable type. The front axle is pivotally mounted at 3 to a rearwardly extending bar 4, which is secured at 5 to a cross member 6 fastened to side pieces 7 and 8. The latter are connected together at their rear ends by a cross member 9, as will be seen from Fig. 2.

In order to steer the device, I have provided pedals 10 which are pivotally suspended at 11 from the bar 4, and which are connected by links 12 to the front axle 1 on each side of the pivot 3.

Secured to the side members 7 and 8 are guide brackets 13, preferably shaped as shown in the drawings. A rocking chair 14 is mounted with its rockers 15 resting on the tops of the side members 7 and 8. On each side of the chair is a guide pin 16, which enters a V shaped slot 17 in the bracket 13. In the position of the chair, shown in Fig. 1, a pin 16 is at the bottom of the slot, but as the chair is rocked back and forth, the pin will slide along the diverging portions of the slot, so that if the cart is turned over, the chair will still remain in position, although it is always free to rock back and forth when in its righted position.

At the rear end of one of the rockers is a downwardly extending bar 18, to the lower end of which is attached a flexible cord, strap or cable 19, this flexible member being passed around a grooved wheel 20. The latter is provided with a ball clutch member 21, arranged to drive a gear 22, when the wheel 20 is revolving in one direction. When, however, the wheel 20 is revolving in one opposite direction, the gear 22 is not operated. The gear 22 is in mesh with a gear 23 which is secured to a wheel 24, mounted on an axle 25. On the opposite side is a wheel 26 which turns freely.

From the foregoing description of the various parts of the device, the operation thereof may be readily understood. The occupant of the chair places his feet on the steering pedals 11. Then by rocking backwardly, the cable 19 is caused to rotate the gear 22, through the medium of the ball clutch 21, and this causes the driving of the wheel 24 by means of the gear 23, thus propelling the cart forwardly. Steering is done by pushing on the steering pedals to turn the front axle in the direction desired. In the desired movement of the rocker, the grooved wheel 20 is turned, as stated, and the turning of this wheel tightens the spring 27, one end of which is attached to the wheel, and the other end is attached to the stub shaft upon which the wheel is mounted. In the forward or upward movement of the rocking chair, the grooved wheel 20 is released from the gear 22, so that the latter does not move. The wheel 20, however, revolves under the tension of the spring 27, as it is permitted to do so by the upward movement of the rocker, thus winding up the flexible member 19. It will thus be seen that by the rocking movement, the device may be propelled. The provision of the brackets 13 with the slots and pins keeps the rocking chair in position, while at the same time, it provides for a free rocking movement at all times.

I claim:

1. In a cart, a frame, rear wheels and front wheels carried thereby, a rocking chair on said frame, a guide bracket, means associated with said rocking chair and arranged to engage said guide bracket for holding said rocking chair on said frame while permitting the free movement of the rocking chair, a downwardly extending bar connected to a rocker of the chair, a grooved wheel carried by the frame, a flexible member attached to the downwardly extending bar and being passed around the grooved wheel whereby the latter is rotated by a rocking movement of the chair, and means associated with said grooved wheel for driving one of said rear wheels when the rocker is moved in one direction and for releasing the driving wheel when the rocker is moved in the opposite direction.

2. In a cart, a frame, rear wheels and front wheels carried thereby, a rocking chair on said frame, a guide bracket, means associated with said rocking chair and arranged to engage said guide bracket for holding said rocking chair on said frame while permitting the free movement of the rocking chair, a downwardly extending bar connected to a rocker of the chair, a grooved wheel carried by the frame, a flexible member attached to the downwardly extending bar and being passed around the grooved wheel whereby the latter is rotated by the rocking movement of the chair, and means associated with said grooved wheels for driving one of said rear wheels when the chair is rocked rearwardly and for releasing the grooved wheel when the chair is rocked forwardly.

3. In a cart, a frame, rear wheels and front wheels carried thereby, a rocking chair on said frame, a guide bracket, means associated with said rocking chair and arranged to engage said guide bracket for holding said rocking chair on said frame while permitting the free movement of the rocking chair, a downwardly extending bar connected to a rocker of the chair, a grooved wheel carried by the frame, a flexible member attached to the downwardly extending bar and being passed around the grooved wheel whereby the latter is rotated by a rocking movement of the chair, and means associated with said grooved wheel for driving one of said rear wheels when the rocker is moved in one direction and for releasing the grooved wheel when the rocker is moved in the opposite direction, said means comprising a gear carried by the frame, a ball clutch member carried by the grooved wheel and arranged to operatively engage said gear when the rocker is moved in one direction and to release said gear when the rocker is moved in the opposite direction, and a second gear mounted upon one of said rear wheels, said last named gear being in mesh with said first named gear, whereby the driving movement is imparted to said rear wheel when the rocker is moved in one direction.

4. In a cart, a frame, a rear axle carried thereby, wheels mounted on said rear axle, a front axle carried thereby, wheels mounted on said front axle, a rocking chair mounted on said frame, pedals connected to said front axle, whereby the latter may be steered by an occupant of the rocking chair, a guide bracket, means associated with said rocking chair and arranged to engage said guide bracket for holding said rocking chair on said frame while permitting the free movement of the rocking chair, a downwardly extending bar connected to a rocker of the chair, a grooved wheel carried by the frame, a flexible member attached to the downwardly extending bar and being passed around the grooved wheel whereby the latter is rotated by a rocking movement of the chair, and means associated with said grooved wheel for driving one of said rear wheels when the rocker is moved in one direction and for releasing the grooved wheel when the rocker is moved in the opposite direction.

JOSEPH HINTZ.